United States Patent
Tsukada et al.

(12) 
(10) Patent No.: US 6,898,444 B2
(45) Date of Patent: May 24, 2005

(54) DATA PROCESSING APPARATUS

(75) Inventors: Katsumi Tsukada, Ina (JP); Minoru Niimura, Musashino (JP); Takashi Kimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 589 days.

(21) Appl. No.: 09/955,560

(22) Filed: Sep. 18, 2001

(65) Prior Publication Data

US 2002/0052220 A1 May 2, 2002

(30) Foreign Application Priority Data

Sep. 20, 2000  (JP) ........................................ 2000-285322

(51) Int. Cl.[7] ................................................. H04B 1/38
(52) U.S. Cl. .................. 455/566.1; 455/574; 455/556.1
(58) Field of Search ................... 455/566, 574, 455/343.2, 344, 457, 517, 550.1, 552.1, 553.1, 556.1, 556.2; 713/300

(56) References Cited

U.S. PATENT DOCUMENTS 6,092,209 A * 7/2000 Holzhammer et al. ...... 713/324

FOREIGN PATENT DOCUMENTS

JP         0200024298 A  *  8/2000  ............ H04M/1/73

* cited by examiner

Primary Examiner—Melur Ramakrishnaiah
(74) Attorney, Agent, or Firm—Mark P. Watson (57) ABSTRACT

A mobile phone 10 in accordance with the present invention includes a host CPU 11, a display engine 12 and a liquid crystal display device 13. Also, the display engine 12 is equipped with a host interface 14, a command interrupt logic circuit 15, a data processing section 16 and a liquid crystal drive apparatus 17. Upon reception of video images or the like, the host CPU 11 is connected to the data processing section 16, and upon completion of reception of video images, the host CPU 11 is connected to the liquid crystal drive apparatus 17 such that higher level functions can be added while maintaining the conventional host interface.

10 Claims, 5 Drawing Sheets

DATA PROCESSING APPARATUS

BACKGROUND OF THE INVENTION

1. Field of the Invention

The present invention relates to data processing apparatuses. More particularly, the present invention relates to a data processing apparatus that displays characters and images on a display device, such as, for example, a liquid crystal display device, an organic material display device, and the like.

2. Description of the Related Art

Conventionally, a data processing apparatus may include a hand-carry telephone (hereinafter, mobile phone), a hand-carry data terminal such as a Personal Digital Assistant (PDA), or the like. These are equipped with a liquid crystal display apparatus, an organic material display device, or the like, and an operation processing apparatus (corresponding to, for example, a host CPU in a mobile phone and a main processor in a PDA). Conventionally, when characters and images are displayed on a display device in a data processing apparatus, the operation processing apparatus in the data processing apparatus directly sends data to a display engine that drives the display device (corresponding to, for example, a liquid crystal driver IC when the display device is a liquid crystal display apparatus).

Figure 6:
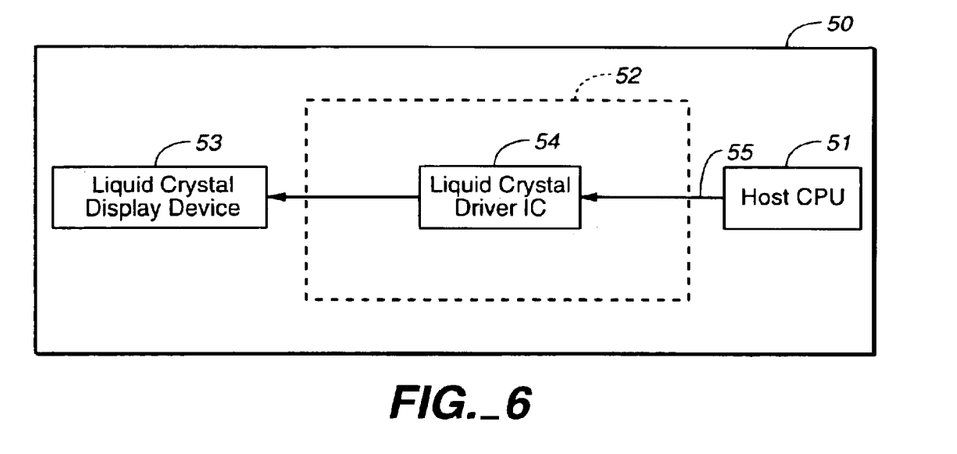
FIG. 6 shows the structure of a part of a conventional mobile phone.

FIG. 6 shows the structure of part of a conventional mobile phone. Referring to FIG. 6, a mobile phone 50 includes a host CPU 51, a display engine 52 and a liquid crystal display device 53. The display engine 52 comprises a liquid crystal driver IC 54. The host CPU 51 and the liquid crystal driver IC 54 are connected by a host interface 55. The host interface 55 includes, for example, a chip select signal line, a read signal line, a write signal line, a data signal line, an interrupt signal line, and the like.

The conventional mobile phone shown in FIG. 6 is limited to displaying characters (such as alphanumeric messages) and still images, but cannot execute Personal Information Management (PIM) software, or handle video images. In contrast, third generation mobile phones (smart phones) that have been under development in recent years, and digital cameras, use high-speed signal processing apparatuses such as Digital Signal Processors (DSPs) as display engines so that a high data rate for transferring video images can be handled, and PIM can be executed.

Figure 7:
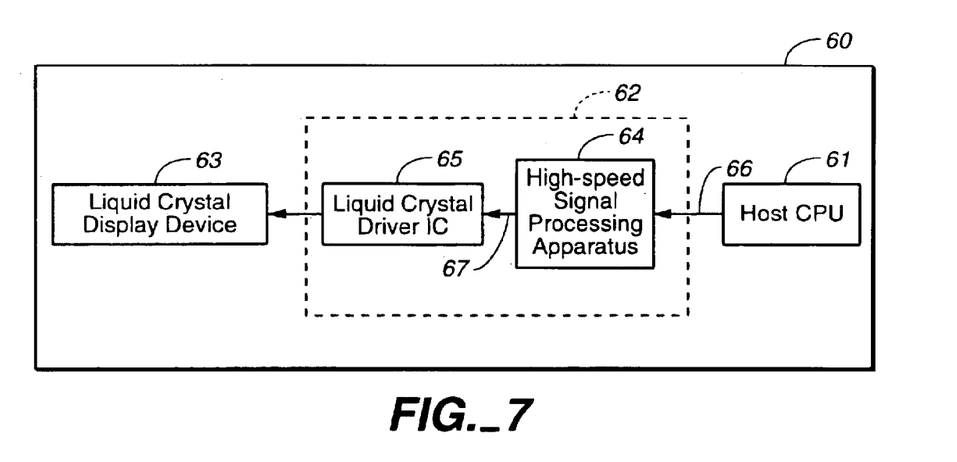
FIG. 7 shows the structure of a part of a third generation mobile phone.

FIG. 7 shows the structure of a part of a third generation mobile phone. Referring to FIG. 7, the third generation mobile phone 60 includes a host CPU 61, a display engine 62 and a liquid crystal display device 63. The display engine 62 comprises a high-speed signal processing apparatus 64 such as DSP, or the like, and a liquid crystal driver IC 65. The host CPU 61 and the high-speed signal processing apparatus 64 are connected by a high-speed bus interface 66. The high-speed bus interface 66 includes, for example, a chip select signal line, a read signal line, a write signal line, a data signal line, an interrupt signal line, and the like. Also, the high-speed signal processing apparatus 64 and the liquid crystal driver IC 65 are connected by a liquid crystal controller interface 67. The liquid crystal controller interface 67 includes, for example, a display data line that transfers display data or the like that has been subject to signal processing.

However, in order to adopt the conventional mobile phone shown in FIG. 6 to the third generation mobile phone 60, the host controller interface 55 of the conventional mobile phone, as viewed from the host CPU 51 to the display engine 52, needs to be substantially modified to function as the high-speed bus interface 66, as viewed from the host CPU 61 to the display engine 62.

Also, in the third generation mobile phone 60 shown in FIG. 7, the high-speed signal processing apparatus 64 needs to be always operated without regard to whether the mobile phone is being used for conversation or its PIM function is being used, and therefore its power consumption is large.

OBJECTS OF THE INVENTION

The present invention addresses the problems described above. It is an object of the present invention to provide a data processing apparatus that can add high-level functions while maintaining the conventional host interface, and in which commands are transferred from a CPU to a high-speed signal processing apparatus such as a DSP or the like in a data processing section upon reception of video images and execution of PIM, and instructions are transferred to a liquid crystal driver IC or the like upon completion of reception of video images or completion of execution of PIM. Also, it is an object of the present invention to provide a data processing apparatus that can reduce overall power consumption of the data processing apparatus by placing the high-speed signal processing apparatus in a low power consumption state when video images are not received or PIM is not executed. Furthermore, it is an object of the present invention to provide a data processing apparatus that can display electric field intensity, time, and the like, on a liquid crystal display apparatus, or the like, while the high-speed signal processing apparatus is maintained in the low power consumption state, except on the occasions of reception of video images or execution of PIM by directly transferring instructions from the CPU to the liquid crystal driver IC, or the like. Also, it is an object of the present invention to provide a data processing apparatus that can control the high-speed signal processing apparatus from the CPU.

SUMMARY OF THE INVENTION

To solve the problems described above, a data processing apparatus in accordance with the present invention comprises a display device for displaying characters and images, a display driver device that controls display of characters and images on the display device based on commands, a data processing section that transmits instructions to the display driver device, and a command circuit that receives and analyzes commands to control flow of data to one of the display driver device and the data processing section, the command circuit being responsive to one of the commands to change the flow of data from flowing to one of the display driver and the data processing section to flowing to the other of the display driver and the data processing section.

Here, the data processing section is capable of operating in one of two modes, an operation state or a low power consumption state, and shifts to the low power consumption state when a command to shift to the low power consumption state is received or no command is received for a predetermined period of time. Also, it is capable of shifting to the operation state when a command is received, such as a command relating to reception of video images or execution of PIM; and shifting to the power-saving state when a process for the command is completed. Furthermore, the data processing apparatus may be a mobile phone or a hand-carry data terminal (PDA).

Upon reception of video images and execution of PIM, commands are transferred from a CPU to a high-speed signal processing apparatus, processed at a data processing section, and instructions obtained as a result of the processing are transferred to the display driver device, whereby the data processing apparatus can add high-level functions while keeping the conventional host interface. Also, when video images are not received or PIM is not executed, the signal processing section is placed in a low power consumption state such that the power consumption of the entire data processing apparatus can be reduced. Furthermore, since instructions can be directly transferred from the CPU to the display drive device, electric field intensity, time and the like can be displayed on a display device while the data processing section can be maintained in a lower power consumption state except upon reception of video images or execution of PIM. Also, the data processing section can be controlled from the CPU.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

An embodiment of the present invention is described with reference to the accompanying drawings. In the following discussion, the present invention is applied to one example of a data processing apparatus, which is a mobile phone. This example is provided to simplify the discussion. However, the present invention, as described as follows, is equally applicable to a mobile phone, a hand-carry terminal (such as a PDA or smart pager), a digital still camera, an information appliance, or the like.

Figure 1:
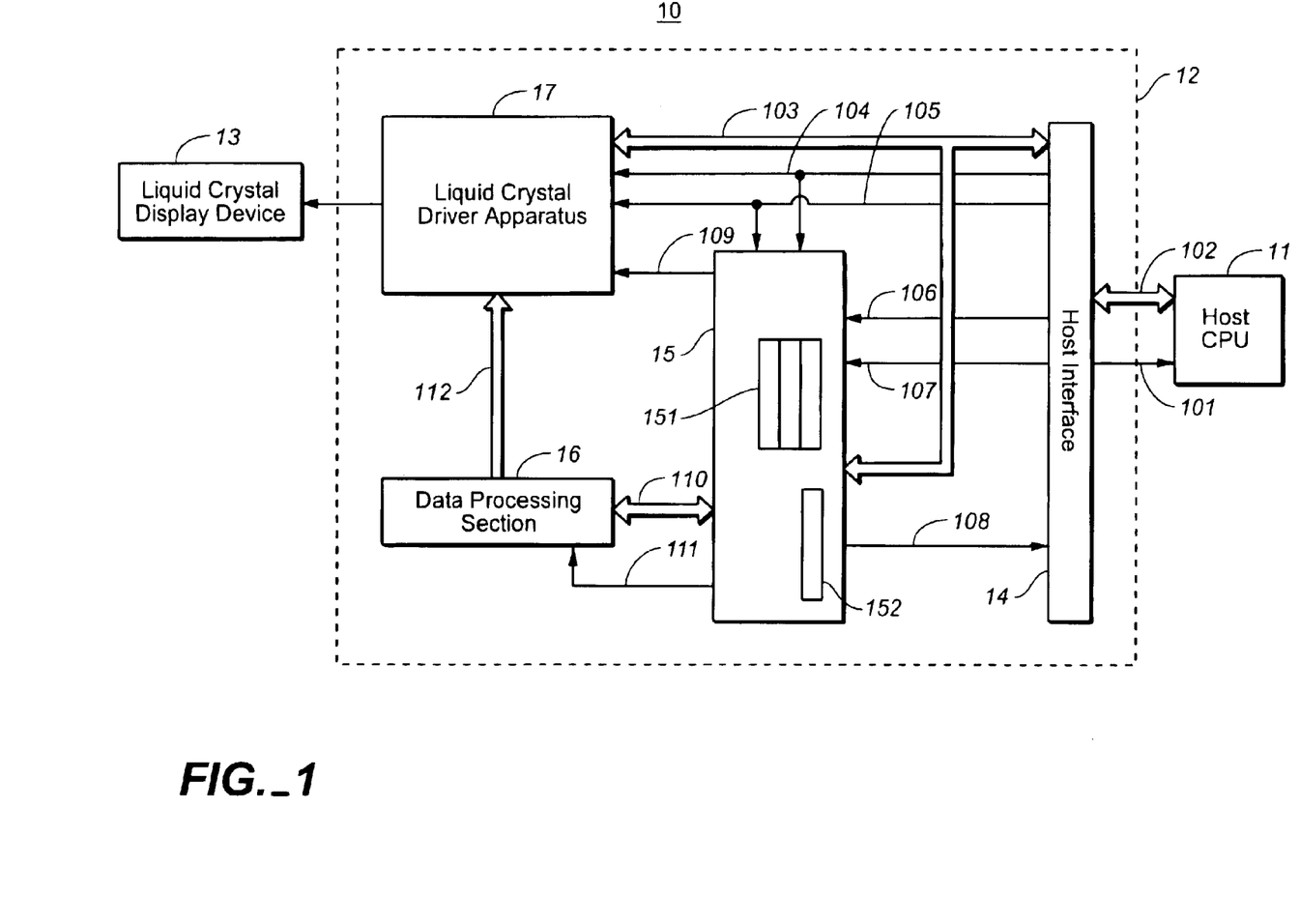
FIG. 1 is a schematic representation of a data processing apparatus in accordance with an embodiment of the present invention.

FIG. 1 schematically illustrates the structure of a part of a mobile phone in accordance with an embodiment of the present invention.

As shown in FIG. 1, the data processing apparatus (e.g. mobile phone) 10 of the present embodiment comprises a host CPU 11, a display engine 12, and a liquid crystal display device 13. Also, the display engine 12 comprises a host interface 14, a command interrupt logic circuit 15, a data processing section 16, and a liquid crystal driver apparatus 17.

The host CPU 11 performs overall control of the mobile phone 10. The host CPU 11 transmits an interface switching command for switching between directly sending a command to the liquid crystal driver apparatus 17 and allowing the data processing section 16 to send instructions to the liquid crystal driver apparatus 17, a stand-by command for shifting the data processing section 16 to a stand-by state, a suspend command for shifting the data processing section 16 to a suspend state, a time update command for re-writing time data in the data processing section 16, a communication command for transferring telephone numbers or the like, a key-input data reception command, and the like, to the host interface 14.

The command interrupt logic circuit 15 receives commands and data that are sent from the host CPU 11 via a command and data line 103 through the host interface 14, and controls the data processing section 16 and the liquid crystal driver apparatus 17 based on the commands and data. The command interrupt logic circuit 15 includes a group of a specified number of command registers 151 that retain commands and data that accompany the commands, and a status register 152 that retains a status of the command interrupt logic circuit 15.

The data processing section 16 is a high-speed operation processing apparatus such as DSP, which receives commands and data from the host CPU 11 and transmits instructions to the liquid crystal driver apparatus 17 based on the commands and data, when the mobile phone 10 receives a video image or executes PIM.

The data processing section 16 shifts to a stand-by state upon reception of a stand-by command from the host CPU 11 or upon expiration of a set time. Also, the data processing section 16 shifts to a suspend state upon reception of a suspend command from the host CPU 11 or upon expiration of a set time in the stand-by state. Power consumption is reduced when the data processing section 16 is in the stand-by state or in the suspend state.

The liquid crystal driver apparatus 17 is a driver IC or the like to display characters and images on the liquid crystal display device 13.

The host CPU 11 and the host interface 14 are connected by a command and data line 102 and an interrupt request line 101.

The command and data line 103 connects the host interface 14, the command interrupt logic circuit 15, and the liquid crystal driver apparatus 17.

A read signal line 104 and a write signal line 105 connect the host interface 14 and the liquid crystal driver apparatus 17.

The host interface 14 and the command interrupt logic circuit 15 are connected by a chip select signal line 106, a signal line 107 and an interrupt request line 108.

A chip select signal line 109 connects the command interrupt logic circuit 15 and the liquid crystal driver apparatus 17.

The command interrupt logic circuit 15 and the data processing section 16 are connected by a command and data line 110 and an interrupt request line 111.

The data processing section 16 and the liquid crystal driver apparatus 17 are connected by a liquid crystal controller interface 112.

Figure 2:
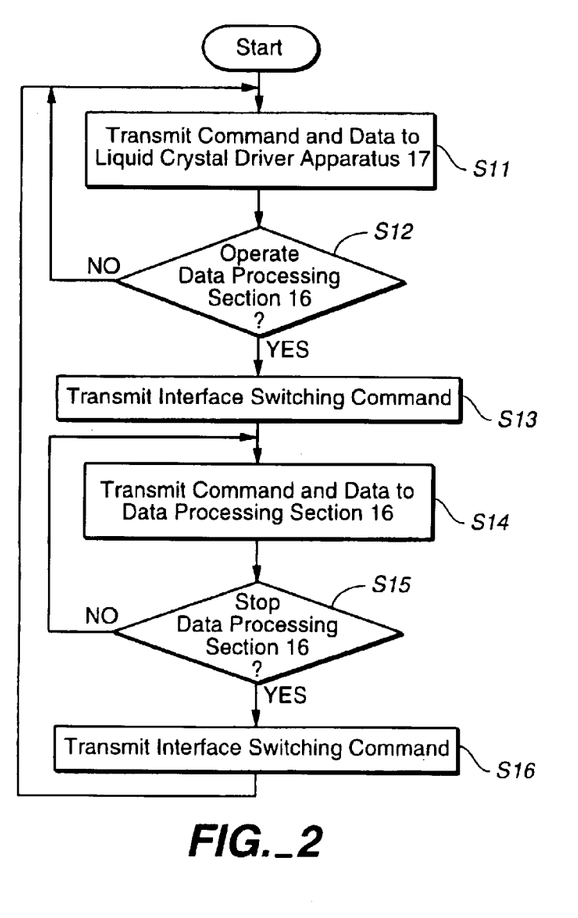
FIG. 2 is a flow chart illustrating a process of a host CPU in FIG. 1.
Figure 3:
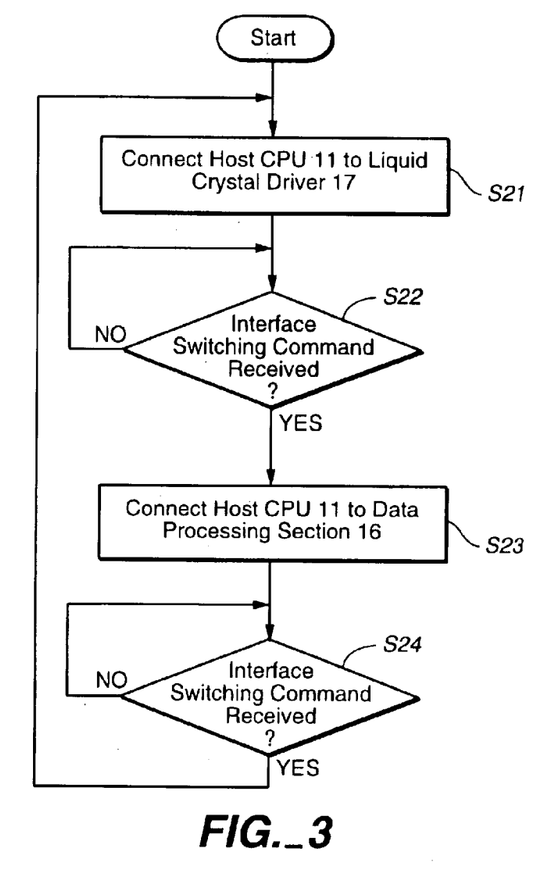
FIG. 3 is a flow chart illustrating a process of a command interrupt logic circuit in FIG. 1.
Figure 4:
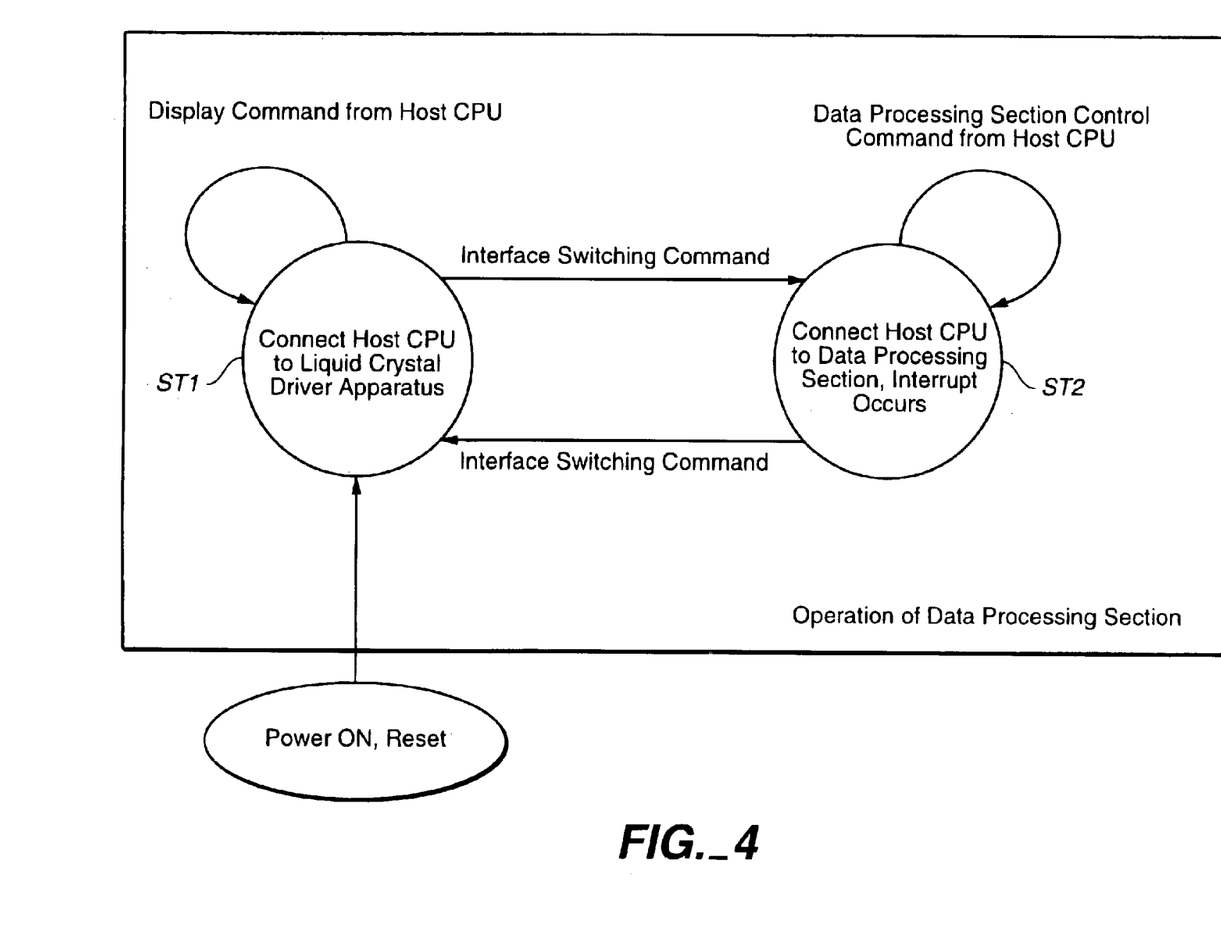
FIG. 4 is a state shift diagram of the command interrupt logic circuit in FIG. 1.
Figure 5:
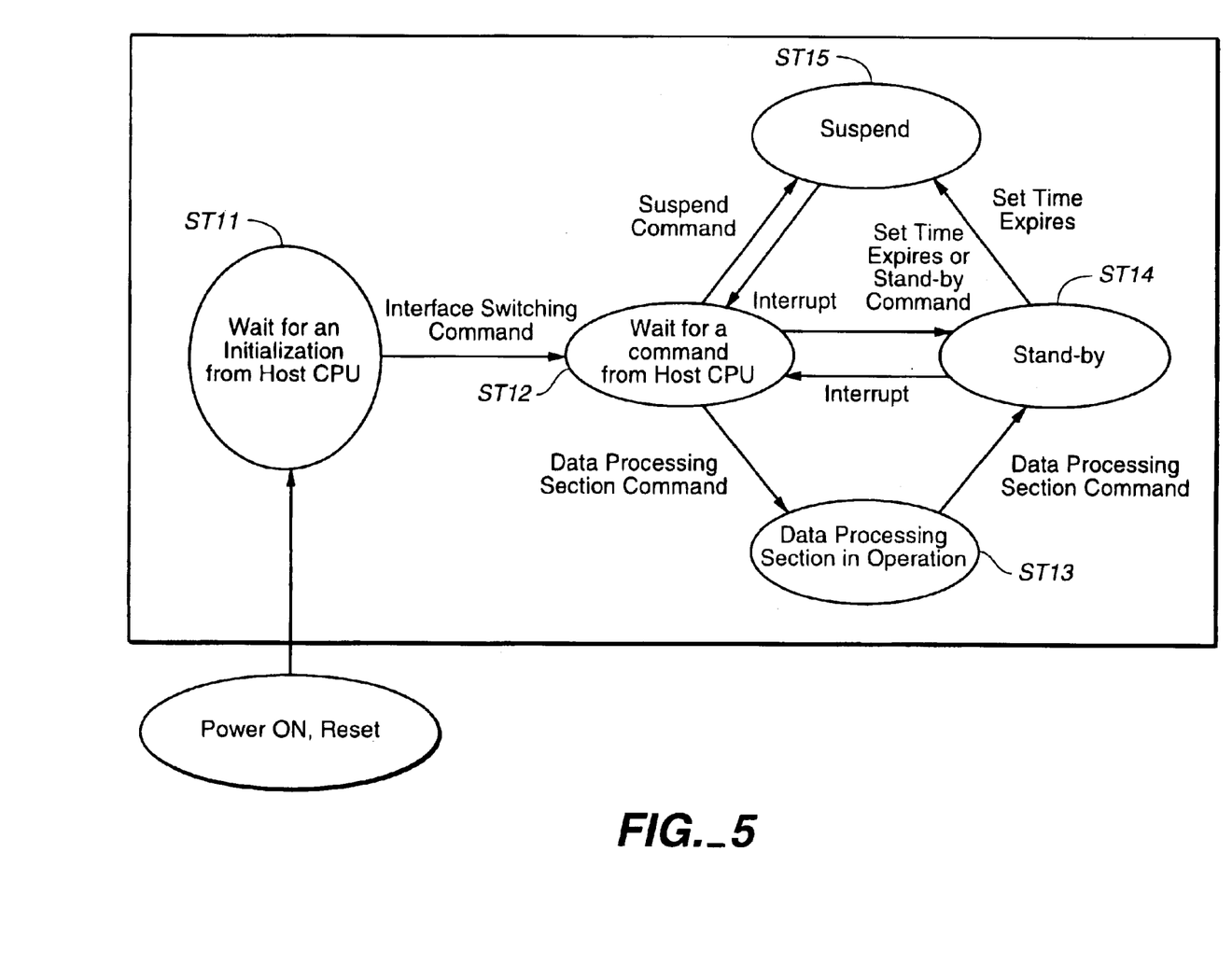
FIG. 5 is a state shift diagram of the data processing section in FIG. 1.

Next, an operation of the mobile phone 10 in accordance with an embodiment of the present invention is described. FIG. 2 is a flow chart that generally shows a process performed by the host CPU 11. Also, FIG. 3 is a flow chart that generally shows a process performed by the command interrupt logic circuit 15. Also, FIG. 4 is a state-shift diagram of the command interrupt logic circuit 15. FIG. 5 is a state-shift diagram of the data processing section 16. The operation of the mobile phone 10 is described below with reference to FIGS. 2~5.

When power is turned on or re-set, the host CPU 11 starts a process shown in FIG. 2, and the command interrupt logic circuit 15 starts a process shown in FIG. 3. Also, the command interrupt logic circuit 15 is placed in a state in which the host CPU 11 is connected to the liquid crystal driver apparatus 17 (state ST1 in FIG. 4). Furthermore, the data processing section 16 waits for an initialization from the host CPU 11 (state ST11 in FIG. 5), and thereafter waits for a command from the host CPU 11 (state ST12 in FIG. 5).

When the process in FIG. 2 is started, in step S11, the host CPU 11 transmits command and data to the liquid crystal driver apparatus 17. Next, in step S12, the host CPU 11 checks whether or not the data processing section 16 needs to be operated to handle reception of video images or execution of PIM. Then, the host CPU 11 returns the process to step S11 if the data processing section 16 does not need to be operated, or advances the process to step S13 if it does. In this manner, the host CPU 11 repeats steps S11~S12 until the operation of the data processing section 16 is needed to handle reception of video images or execution of PIM, or until there are no further commands and data to be transmitted.

Concurrently, the process in FIG. 3 is started, and the command interrupt logic circuit 15 connects the host CPU 11 to the liquid crystal driver apparatus 17 in step S21. Next, the command interrupt logic circuit 15 waits for reception of an interface switching command from the host CPU 11 in step S22. Accordingly, the command interrupt logic circuit 15 maintains state ST1 until an interface switching command from the host CPU 11 is received. Therefore, in step S11, command and data transmitted from the host CPU 11 are transferred to the liquid crystal driver apparatus 17 through the command and data line 103, and the liquid crystal driver apparatus 17 displays characters, images and the like on the liquid crystal display apparatus 13 based on the commands and data. In the manner described above, the command interrupt logic circuit 15 repeats step S22 and continues state ST1 until an interface switching command from the host CPU 11 is received.

Meanwhile, the data processing section 16, which is waiting for a command from the host CPU 11 in state ST12 in FIG. 5, shifts to a stand-by state (state ST14) when it receives a stand-by command from the host CPU 11, or when a set time expires; or shifts to a suspend state (state ST15) when it receives a suspend command from the host CPU 11. Also, the data processing section 16 shifts to a suspend state (state ST15) when a set time expires in the stand-by state (state ST14). The data processing section 16 in the stand-by state (state ST14) and in the suspend state (state ST15) keeps the power consumption at low level. The clock for executing processing can be stopped to conserve power in the suspend state or mode and the clock frequency can be reduced to conserve power in the stand-by state or mode. The data processing section 16 waits for an interrupt command from the host CPU 11 in state ST14 or state ST15.

When it is necessary to operate the data processing section 16, i.e. upon reception of video images or upon execution of PIM, the host CPU 11 transmits an interface switching command in step S13 in FIG. 2. Then, the host CPU 11 transmits command and data to the data processing section 16 in step S14. Next, in step S15, the host CPU 11 checks whether or not the data processing section 16 is to be stopped. The host CPU 11 returns the process to step S14 when the data processing section 16 does not need to be stopped, or advances the process to step S16 when it does. In the manner described above, the host CPU 11 repeats steps S14~S15 until the data processing section 16 is stopped upon completion of reception of video images or completion of execution of PIM.

Concurrently, the command interrupt logic circuit 15, which is standing by in step S22 in FIG. 3 and continuing in state ST1 in FIG. 4, advances the process to step S23 when it receives an interface switching command. In step S23, the command interrupt logic circuit 15 starts the data processing section 16 and connects the host CPU 11 to the data processing section 16. In this instance, the command interrupt logic circuit 15 shifts to a state (state ST2) in which the host CPU 11 connects to the data processing section 16 from the state (state ST1) in which the host CPU 11 connects to the liquid crystal driver apparatus 17. Next, the command interrupt logic circuit 15 waits to receive an interface switching command from the host CPU 11 in step S24. Accordingly, the command interrupt logic circuit 15 continues in state ST2 until it receives an interface switching command from the host CPU 11. Therefore, the command and data transmitted from the host CPU 11 in step S11 are transferred through the command and data line 110 to the data processing section 16. The data processing section 16 transmits instructions to the liquid crystal driver apparatus 17 based on the command and data. The liquid crystal driver apparatus 17 displays characters, images and the like on the liquid crystal display apparatus 13 based on the instructions from the data processing section 16. In the manner described above, the command interrupt logic circuit 15 repeats step S24 and continues state ST2 until it receives an interface switching command from the host CPU 11.

Concurrently, the data processing section 16, which had been continuing in state ST14 or state ST15 in FIG. 5, shifts to state ST12, when it receives command and data by an interrupt from the host CPU 11. Then, the data processing section 16 transmits instructions to the liquid crystal driver apparatus 17 based on the command and data from the host CPU 11.

When the data processing section 16 is stopped due to completion of reception of video images or completion of execution of PIM, the host CPU 11 transmits an interface switching command in step S16 in FIG. 2. Then, the host CPU 11 transmits command and data to the liquid crystal driver apparatus 17 in step S11. Next, in step S12, the host CPU 11 checks again whether or not the data processing section 16 needs to be operated due to another reception of video images or another execution of PIM. Then, the host CPU 11 returns the process to step S11 if the data processing section 16 does not need to be operated, or advances the process to step S13 if it does. In this manner, the host CPU 11 repeats steps S11~S12 until the operation of the data processing section 16 is needed due to another reception of video images or execution of PIM.

The command interrupt logic circuit 15, which is standing by in step S24 in FIG. 3 and continuing in state ST2 in FIG. 4, advances the process to step S21 when it receives an interface switching command. In step S21, the command interrupt logic circuit 15 stops the data processing section 16, and connects the host CPU 11 to the liquid crystal driver apparatus 17. In this instance, the command interrupt logic circuit 15 shifts from state ST2 to state ST1. Next, the command interrupt logic circuit 15 waits to receive an interface switching command from the host CPU 11 in step S22. Accordingly, the command interrupt logic circuit 15 continues in state ST1 until it receives an interface switching command from the host CPU 11. Therefore, the command and data transmitted from the host CPU 11 in step S11 are transferred through the command and data line 103 to the liquid crystal driver apparatus 17. The liquid crystal driver apparatus 17 displays characters, images and the like on the liquid crystal display apparatus 13 based on the command and data from the host CPU 11. In the manner described above, the command interrupt logic circuit 15 repeats step S22 and continues state ST1 until it receives an interface switching command from the host CPU 11.

On the other hand, the data processing section 16, which is transmitting instructions to the liquid crystal driver apparatus 17 based on the command and data from the host CPU 11 in state ST12, shifts to state ST13 when it receives the data processing section command from the host CPU 11, shifts to a stand-by state (state ST14) when it receives a stand-by command from the host CPU 11, or when a set time expires, or shifts to a suspend state (state ST15) when it receives a suspend command from the host CPU 11. The data processing section 16 waits for an interrupt command from the host CPU 11 in state ST14 or in state ST15.

As described above, in the mobile phone 10 in accordance with the present embodiment, when it is necessary to operate the data processing section 16 to handle reception of video images or execution of PIM, the data processing section 16 is started, and the host CPU 11 is connected to the data processing section 16. When the data processing section 16 is stopped upon completion of reception of video images or completion of execution of PIM, the data processing section 16 is stopped, and the host CPU 11 is connected to the liquid crystal driver apparatus 17. As a result, high-level functions can be added while maintaining the conventional host interface 55 shown in FIG. 6. Also, when video images are not received or PIM is not executed, the data processing section 16 is placed in a stand-by state or in a suspend state, such that the overall power consumption of the mobile phone 10 can be reduced. Furthermore, since commands and data can be directly transferred from the host CPU 11 to the liquid crystal driver apparatus 17 through the command and data line 103, electric field intensity, time and the like can be displayed on the liquid crystal display device 13 while the data processing section 16 is maintained in a stand-by state or in a suspend state except upon reception of video images or execution of PIM. Also, the data processing section 16 can be controlled from the host CPU 11.

A data processing apparatus in accordance with one embodiment example of the present invention is described above. The present invention can also be applied to hand-carry data terminal (e.g., PDA, smart pager, etc.), digital still cameras, data/information/internet (i.e. smart) home appliances, and the like.

As described above, by a data processing apparatus in accordance with the present invention, upon reception of video images and execution of PIM, commands are transferred from a CPU to a data processing section; and upon completion of reception of video images or completion of execution of PIM, instructions from the CPU are transferred to a display drive device. As a result, higher level functions can be added to the data processing device while maintaining a conventional host interface. Also, when video images are not received or PIM is not executed, the data processing section is placed in a low power consumption state such that the overall power consumption of the data processing apparatus can be reduced. Furthermore, since instructions can be directly transferred from the CPU to the display drive device, electric field intensity, time and the like can be displayed on a display device while the data processing section is maintained in a lower power consumption state except upon reception of video images or execution of PIM. Also, the data processing section can be controlled from the CPU.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A data processing apparatus comprising a display device for displaying characters and images, a display driver device that controls display of characters and images on the display device based on commands, a data processing section that transmits instructions to the display driver device, and a command circuit that receives and analyzes commands to control flow of data to one of the display driver device or the data processing section, the command circuit being responsive to one of the commands to change the flow of data from flowing to one of the display driver or the data processing section to flowing to the other of the display driver or the data processing section.

2. A data processing apparatus according to claim 1, wherein the data processing section functions in one of an operation state and a low power consumption state, and shifts to the low power consumption state in response to a command to shift to the low power consumption state or if no command is received for a predetermined period of time.

3. A data processing apparatus according to claim 1, wherein the data processing section functions in one of an operation state and a power-saving state, and shifts to the operation state in response to a command requiring processing by the data processing section and shifts to the power-saving state when the processing is completed.

4. A data processing apparatus according to claim 1, wherein data to the data processing section includes display data, key-input data from a host CPU and communicated data from or to the host CPU.

5. A data processing apparatus according to claim 1, wherein the data processing apparatus is one of a mobile phone, a hand-carry data terminal, a digital still camera, or an information home appliance.

6. A method of operating a data processing apparatus comprising a display device for displaying characters and images, a display driver device that controls display of characters and images on the display device based on commands, a data processing section that transmits instructions to the display driver device, and a command circuit that receives and analyzes commands, comprising:

controlling flow of data, by the command circuit, to one of the display driver device or the data processing section, and responding to one of the commands to change the flow of data from flowing to one of the display driver or the data processing section to flowing to the other of the display driver or the data processing section.

7. A data processing method according to claim 6, further comprising operating the data processing section in one of an operation state and a low power consumption state, and shifting to the low power consumption state in response to a command to shift to the low power consumption state or if no command is received for a predetermined period of time.

8. A data processing method according to claim 6, further comprising operating the data processing section in one of an operation state and a power-saving state, and shifting to the operation state in response to a command requiring processing by the data processing section and shifting to the power-saving state when the processing is completed.

9. A data processing method according to claim 6, wherein data to the data processing section includes display data, key-input data from a host CPU, and communicated data from or to the host CPU.

10. A data processing method according to claim 6, wherein the data processing apparatus is one of a mobile phone, a hand-carry data terminal, a digital still camera, or an information home appliance.

* * * * *